(12) United States Patent
Virtuoso et al.

(10) Patent No.: US 12,118,395 B1
(45) Date of Patent: Oct. 15, 2024

(54) SELF-TUNING ANALYTICS SYSTEM WITH OBSERVED EXECUTION OPTIMIZATION

(71) Applicant: Amazon Technologies, Inc., Seattle, WA (US)

(72) Inventors: Anthony A. Virtuoso, Hawthorne, NJ (US); Santosh Chandrachood, Saratoga, CA (US); Bijay Singh Bisht, Foster City, CA (US); Mehul A. Shah, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 882 days.

(21) Appl. No.: 17/116,405

(22) Filed: Dec. 9, 2020

(51) Int. Cl.
*G06F 9/50* (2006.01)
*G06F 9/48* (2006.01)

(52) U.S. Cl.
CPC .......... *G06F 9/5027* (2013.01); *G06F 9/4881* (2013.01); *G06F 9/5072* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 6,757,730 B1* | 6/2004 | Lee | ........................ | G06F 9/465 |
| | | | | 709/201 |
| 7,958,511 B1* | 6/2011 | Pomerantsev | ........ | G06F 9/5027 |
| | | | | 718/104 |
| 8,117,487 B1* | 2/2012 | Raut | ....................... | G06F 11/004 |
| | | | | 709/224 |
| 10,200,261 B2* | 2/2019 | Cuervo Laffaye | | ........................... |
| | | | | H04L 67/1001 |
| 2005/0240745 A1* | 10/2005 | Iyer | ..................... | G06F 13/1668 |
| | | | | 711/E12.079 |
| 2012/0159506 A1* | 6/2012 | Barham | ................ | G06F 9/5044 |
| | | | | 718/104 |
| 2017/0024245 A1* | 1/2017 | Goh | ........................ | G06F 9/5038 |
| 2019/0146848 A1* | 5/2019 | Rastogi | ................. | G06F 9/5061 |
| | | | | 718/104 |

(Continued)

OTHER PUBLICATIONS

Tan et al.; "Tempo: Robust and Self-Tuning Resource Management in Multi-tenant Parallel Databases"; arXiv:1512.00757v1 [cs.DB] Dec. 2, 2015; (Tan_2015.pdf; pp. 1-15) (Year: 2015).*

(Continued)

*Primary Examiner* — Hiren P Patel
(74) *Attorney, Agent, or Firm* — NICHOLSON DE VOS WEBSTER & ELLIOTT LLP

(57) ABSTRACT

Techniques for self-tuning an analytics system via observed execution optimization are described. Upon a need for execution resources, a resource manager can select a type of executor from multiple candidate executor types based at least in part on one or more of current execution data associated with the execution of tasks of a user application and/or historic execution data associated with one or more other applications. The current execution data may include event log data originated by the driver application based on the execution of the user application and/or metric data describing characteristics of one or more worker nodes involved with executing the user application or characteristics of one or more other executors implemented by the one or more worker nodes in executing the user application.

20 Claims, 9 Drawing Sheets

(56) References Cited

U.S. PATENT DOCUMENTS

| | | | | |
|---|---|---|---|---|
| 2019/0158417 | A1* | 5/2019 | Aronovich | H04L 67/10 |
| 2019/0303207 | A1* | 10/2019 | Vadapandeshwara | ........................ G06F 9/4843 |
| 2020/0151018 | A1* | 5/2020 | Jha | G06F 9/4856 |
| 2022/0114026 | A1* | 4/2022 | Cropper | G06F 9/5027 |

OTHER PUBLICATIONS

Tuning Spark, https://spark.apache.org/docs/latest/tuning.html, downloaded on Dec. 16, 2020, 7 pages.

\* cited by examiner

SELF-TUNING ANALYTICS SYSTEM WITH OBSERVED EXECUTION OPTIMIZATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for implementing a self-tuning analytics system with observed execution optimization. According to some embodiments, a distributed data processing system self-tunes its execution environment—such as numbers, configurations, etc., of a set of executors that perform data processing tasks—based on analysis of the overall job and/or historic information associated with the same or similar jobs. In some embodiments, the distributed data processing system can obtain current job information, e.g., from an event log stream provided by a driver of the application, executor metrics emitted by the individual executors performing the job, and/or infrastructural metrics emitted by the underlying worker nodes (or a service that collects and redistributes these metrics) pertaining to computing resource utilization and the like. This information can be used by a resource manager of the distributed data processing system to right-size and/or change the sizes, types, configurations, numbers, etc., of executors used for particular jobs to prevent failures and improve overall performance of the system, without requiring any (or substantially any) tuning involvement of the user that submitted the job(s).

Figure 1:
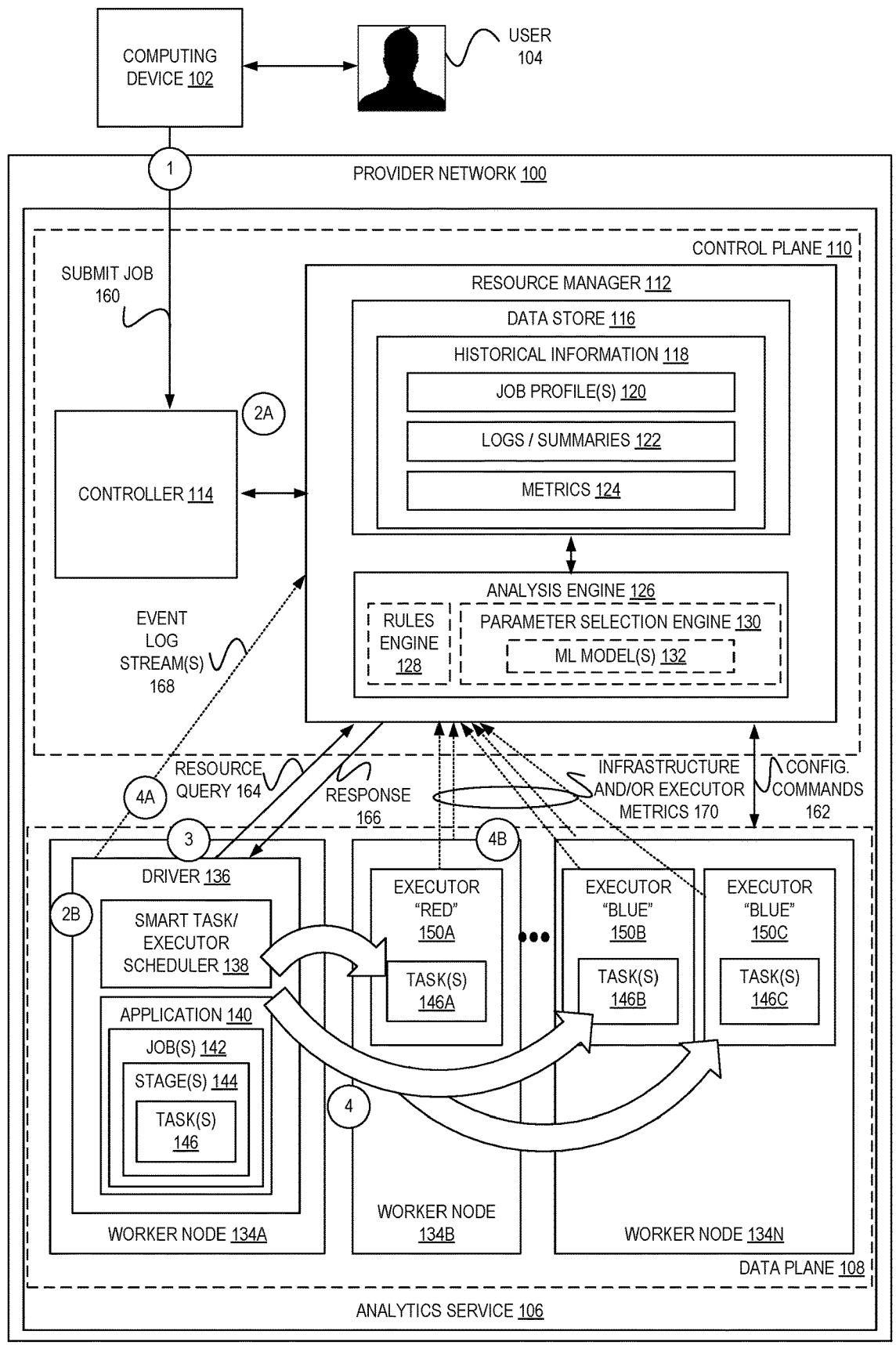
FIG. 1 is a diagram illustrating a provider network environment including a self-tuning analytics system with observed execution optimization according to some embodiments.

FIG. 1 is a diagram illustrating a provider network environment including a self-tuning analytics system with observed execution optimization according to some embodiments. In FIG. 1, an analytics service 106 is implemented within a multi-tenant provider network 100. The analytics service 106 may be implemented using software executed by one or (typically) multiple computing devices at one location or multiple locations. In some embodiments, the analytics service 106 may be a cloud "big data" platform allowing users to process vast amounts of data using open source tools such as Apache Spark, Apache Hive, Apache HBase, Apache Flink, Apache Hudi, etc.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, a provider network 100 may provide a container service in the form of a container orchestration and management service (referred to in various implementations as a container service, cloud container service, container engine, or container cloud service) that allows external (and/or internal) users of the cloud provider network to instantiate and manage containers. In some embodiments the container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As indicated herein, the analytics service 106 may allow users 104 to execute user applications in a distributed manner, e.g., using a large-scale data processing system (e.g., for "big data") such as the Apache Spark™ general-purpose distributed data processing engine. Such data processing systems are in widespread use by a variety of types of users and organizations for a wide range of large dataset processing purposes. These systems typically employ a distributed approach to processing data where multiple "executors" work together to perform a set of operations on a dataset, as opposed to the more traditional technique of using one such processing node.

Some data processing systems, such as Spark, allow for other modules to operate "on top" of the underlying core data processing engine, providing libraries for structured query language (SQL) type querying, machine learning, graph computation, stream processing, etc., any or all of which can be used together in an application 140. These systems common support applications written in any of multiple different programming languages; e.g., Spark supports Java, Python, Scala, and R. Application developers and data scientists may incorporate these systems into their applications to rapidly query, analyze, and transform data at scale, such as for implementing Extract-Transform-Load (ETL) or Structured Query Language (SQL) batch jobs across large data sets, processing of streaming data from sensor devices, Internet-of-Things devices, or financial systems, as well as for machine learning tasks.

Commonly, data processing systems like Spark can execute applications 140 using a driver 136 and a set of distributed worker processes, which may be referred to as "executors" (e.g., executors 150A-150C). For example, a Spark driver 136 may run the main( ) method of an application 140 and create the SparkContext. The driver 136 typically runs on a node 134A in the cluster of worker nodes 134A-134N and schedules the job execution with a resource manager 112, responds to a user's program or input, analyzes, schedules, and distributes work across the executors, and maintains metadata about the running application.

Spark executors 150A-150C, in contrast, are a distributed process responsible for the execution of tasks 146. Each Spark application 140 has its own set of executors 150A-150C, which stay alive for the life cycle of a single Spark application 140. Executors 150A-150C perform all the data processing of a Spark job 142, store results in memory (typically only persisting to disk when specifically instructed by the driver program) and return results to the driver 136 once they have been completed. In many environments, a single worker node 134A-134N (e.g., a virtual machine or container, or even an entire physical host computing device) can implement one or multiple executors—e.g., one executor per node, one executor per core, etc.

In some embodiments, a user 104 of the analytics service 106 may use a computing device 102 (e.g., via a console provided via a web browser or other application) to transmit one or more messages at circle (1) to the analytics service 106 to submit a job (at 160) for processing. The submit job 160 request may be provided to a controller 114 of the analytics service 106. The controller 114, along with a resource manager 112, may be entities implemented as part of a control plane 110 of the analytics service 106 that provides management and governance functionalities, and the analytics service 106 may also include a data plane 108 with worker nodes 134A-134N that actually execute user applications and operate upon user datasets. In some embodiments, the control plane 110 is implemented using a first set of one or more computing devices (e.g., in one or each region of the provider network 100) while the data plane 108 is implemented using a second set of one or more computing devices (e.g., in one or each region of the provider network 100).

Upon receipt of the submit job 160 command, at circle (2A) the controller 114 may interact with the resource manager to obtain a worker node 134A to run a driver 136 for the job. The resource manager 112 may launch/configure a worker node 134A at this point, e.g., for the driver 136, which converts user code containing transformations and actions into a logical plan called a directed acyclic graph (DAG). Resilient Distributed Datasets (RDDs) are also created in the driver 136 and do nothing until the action is called. At this stage, the driver also performs optimizations such as pipelining narrow transformations. The driver 136 then converts the DAG into a physical execution plan. After conversion to a physical execution plan, the driver creates physical execution units called tasks 146 at each stage 144 of the job(s) 142, which collectively make up the application 140.

The driver 136 now, at circle (3), communicates with the resource manager 112 to obtain resources in the form of executors 150 to execute the tasks 146. This interaction may make use of one or more resource queries 164, in which the driver 136 may (or may not) specify a number, type, and/or configuration of desired executors. As part of this resource query 164, the driver 136 may also provide information about the application 140 in the form of descriptions of jobs 142, stages 144, tasks 146, underlying data, user application code, the DAG, the physical execution plan, etc.

The resource manager 112 thus is tasked with allocating worker nodes and/or executors in response to the query 164. In some embodiments, when the driver 136 requests a very specific query—e.g., seeking a particular number, type, and/or configuration of executor—the resource manager 112 may simply fulfill that request (or, overrule the requested configuration with its own determined setup), though in cases where the driver 136 may not be quite so specific (e.g., just requesting one executor without specifying a type or other characteristics) or not specific at all (e.g., not requesting any specific type or amount of executors), the resource manager 112 may determine one or more aspects involving the executors on its own.

In some embodiments, the resource manager 112 may perform an initial tuning of the system at this point during this selection of the initial types, numbers, and/or configurations of worker nodes. For example, an analysis engine 126 may obtain information about the job (e.g., from the driver 136 with the query) and compare the job (or information generated based on the job, such as a job profile describing a size and/or complexity of the job, size and/or complexity of the involved data, etc.) to intelligently generate a set of worker nodes 134A-134N and/or executors 150A-150C for the job.

In some embodiments, the analysis engine 126 may, for example, generate a job profile for the job and use it to identify one or more "similar" job profiles from a set of job profiles 120 stored in a data store 116. With these one or more similar job profiles, the analysis engine 126 may select numbers, types, and/or configurations of worker nodes 134A-134N and/or executors 150A-150C to be launched. As an example, the analysis engine 126 may use logic defined by a rules engine 128 indicating that one specific historic job profile is to be selected having a highest similarity (e.g., using a similarity/distance metric known to those of skill in the art) to the current job's profile (and optionally other conditions, such as a "success" execution state, a positive feedback score from the submitting user, etc.) and then select the same numbers/types/configurations of worker nodes/executors. Alternatively, or additionally, the rules engine 128 may include a rule indicating that a historic job profile (e.g., from a set of multiple "similar" historic job profiles) is to be selected based on one or more of a lowest execution time, lowest failure rate, highest user feedback score, etc., according to a heuristic and selecting the same numbers/types/configurations of worker nodes/executors as that used by historic job corresponding to the selected job profile. Moreover, in some embodiments, the analysis engine 126 may include a parameter selection engine 130, optionally with one or more machine learning (ML) models trained based on previous historical information 118. Accordingly, information about the sought-to-be executed job (e.g., via a job profile) can be used as input to the ML model(s) 132 to cause the model to infer information such as a number, type, and/or configuration of executors, worker nodes, etc., to execute the job.

Thus, the resource manager 112 can allocate one or more worker nodes 134B-134N (e.g., a Spark container, such as a pre-built Docker image that includes Apache Spark and other dependencies needed to run distributed data processing jobs) and cause one or more executors to be launched (e.g., via instructing NodeManagers to run the executors). In some embodiments, the resource manager 112 may provide a resource query response 166 back to the driver just after receipt of the resource query 164, after configuring worker nodes 134B-134N and/or executors 150A-150C, or at another time, which may indicate a status of the request (e.g., success, failure), a description of the executors 150A-150C that were configured, or the like.

When the executors 150A-150C are run, they may "register" with the driver 136 to indicate their existence and ability to be used for executing tasks. Thus, the driver 136 has a complete view of the executors 150A-150C. In some embodiments, this resource query 164 (and responsive executor configuration) process may continue one or multiple times—e.g., a driver 136 may issue a resource query 164 request once for each desired executor, once to seek a different number of executors, etc.

At circle (4), the smart task/executor scheduler 138 (or, "scheduler") of the driver 136 may send tasks 146A-146C to the executor(s) 150A-150C (e.g., by sending requests via the resource manager 112) based on the data placement. At this point, user application code is executed by the executors 150A-150C and may cause information pertaining to the statue of its task processing to be provided back to the driver 136 (e.g., stage of execution, status information, etc.).

During the process of executing the application 140, the driver 136 may provide this information (e.g., stage of execution, status information, etc.) or other aggregated or higher-level application status information to the resource manager 112 via an event log stream 168 at circle (4A), where particular "events" are emitted by the driver 136 based on the processing, e.g., and may indicate information such as an amount of input bytes, shuffle sizes used, processing utilization time, etc. Additionally, at circle (4B) ones of the executors 150A-150C and/or worker nodes 134A-134N may also emit metrics 170 pertaining to their operational status back to the resource manager 112—e.g., executors may emit metrics pertaining to the number of rows of data it is operating upon, the number of partitions it is seeing, etc., while the worker nodes may emit metrics such as computing resource utilization/availability (e.g., processor utilization, memory utilization, storage utilization, network utilization) and the like. This information from event log streams 168 and/or the infrastructural/executor metrics 170 may be stored as logs/summaries 122 and metrics 124, respectively, and used for further self-tuning processes disclosed herein.

In some embodiments, the analytics service 106 may thus collect this information, across many jobs 142 over time, and compile a large amount of job profiles 120, logs/summaries 122, and metrics 124. This information can be thus used to continually improve the self-tuning of the data plane 108 over time.

Figure 2:
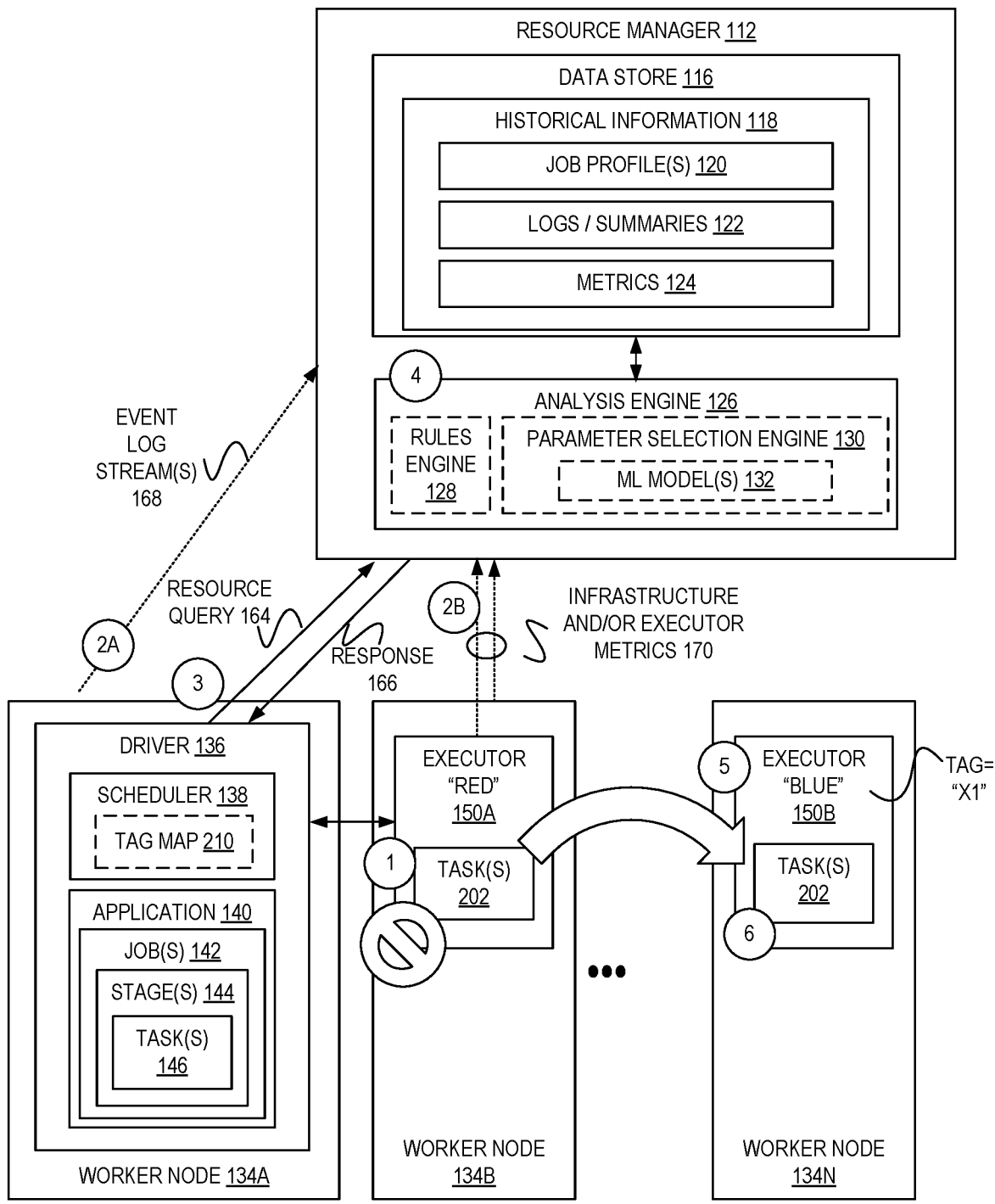
FIG. 2 is a diagram illustrating an environment with a self-tuning analytics system accommodating execution failures or deficiencies according to some embodiments.

For example, FIG. 2 is a diagram illustrating an environment with a self-tuning analytics system accommodating execution failures or deficiencies according to some embodiments. In this figure, a driver 136 running an application 140 uses at least an executor 150A running on a worker node 134B to run a task 202. As this executor 150A runs the task 202, it may provide at circle (1) information back to the driver 136 pertaining to its execution status, how much it has processed, etc. In this example, it is assumed that the executor 150A is not well-suited for performing the task 202; for example, it may not have sufficient memory or processing capability, and thus the task execution may be degraded (compared to how it would be expected to be performed on an appropriately-sized executor) or actually fail. This under-performance or failure may be reflected within data transmitted back via event log streams 168, infrastructure metrics and/or executor metrics 170 sent at circles (2A) and (2B).

In this scenario, the driver 136 may detect the performance issue and seek additional executor resources for re-trying the task 202 via another resource query 164 sent at circle (3). In some embodiments, the scheduler 138 may create a tag or label (e.g., an alphanumeric identifier or other value that is unique, here shown as "X1" with reference to executor 150B) and store an association between that tag and the task in a tag map 210 (e.g., insert a record associating a tag and a task identifier), though in some embodiments this mapping information need not be stored, such as by having a tag be deterministically re-computed based on the task identifier (e.g., via a consistent hashing technique). In some cases, this tag may be included in the resource query 164, indicating to the resource manager 112 that the tag is to be associated with a new executor launched such that the scheduler 138 can easily determine, e.g., based on the executor providing this tag to the driver when it is launched and reports back to the driver, that this executor is the one that should perform the task.

In some embodiments, the resource query 164 may include an identifier of a specific type of executor that is being requested, or an identifier of a particular amount or difference sought for a computing resource for an executor (e.g., a specific amount of memory for an executor, a general need for more memory for an executor, etc.). The resource manager 112 may thus, at circle (4) based on this information, launch an executor at circle (5) with a different configuration satisfying the query—e.g., launch an executor with one or more of more memory, processing capability, storage availability, network availability, or the like. This "different" type of executor is reflected as a "blue" executor 150B, which has one or more computing resource dimensional differences compared to the "red" executor 150A that was unable to satisfactorily run the task 202. As described herein, the resource manager 112 may configure the executor with an optionally-supplied tag (from within the resource query 164) so that when it launches and registers itself with the driver 136, it may provide the tag to the driver 136 to allow the scheduler 138 to identify, by using the tag as a lookup key, the task 202 that is to be assigned to this new executor 150B and thus give it the task 202 to perform at circle (6). Alternatively, upon an executor connecting to the driver 136, the driver 136 may query another entity (e.g., the resource manager) or datastore using another identifier of the executor (e.g., an IP address, a unique identifier, a name) to identify the tag, and/or may query another entity (e.g., the resource manager) or datastore with the tag to determine the resource characteristics/availabilities for the executor based on the tag.

In some embodiments, the resource query 164 optionally may not identify what computing resource dimension or type is needed by the driver 136, and/or may not indicate a particular type of executor that is desired. Instead, the analysis engine 126 may determine, based on data in the event log stream 168 (e.g., indicating a recent failure of a task) and/or metrics 170 (e.g., indicating issues with the executor's execution, and/or issues with resource exhaustion on the part of the executor or worker node) that a particular computing resource dimension should be increased or decreased, a particular type of executor is to be launched, etc.

For example, the rules engine 128 may include a rule indicating that when a task failure is detected (e.g., in event log stream 168) within a threshold amount of time, a new executor is to be launched having a computing resource amount in excess (e.g., twice as much) as one or multiple dimensions of the executor that failed the task (e.g., any computing resource where utilization was above a threshold percentage usage). The determination may alternatively or additionally make use of the historical information 118, perhaps from other jobs, stages, or tasks, to identify an executor size/type that is most appropriate for a task—e.g., by identifying a previously-executed task that is similar (e.g., based on the operations performed, size or amount or type of data involved, etc.) and identifying the type of executor that performed that task. As a result, the analytics service 106 may flexibly launch support heterogeneous executors for a single application, such that individual executors are well-suited to their particular tasks. Thus, the execution of the user application is "right sized" and thus can be executed efficiently and effectively.

Accordingly, in some embodiments the driver 136 may be able to provide specific instructions as to the numbers and/or types of executors 150 it seeks, and the resource manager 112 may honor the specifics provided in the query 164 by launching specifically what the driver 136 requests. However, in some embodiments, details provided within the query 164 by the driver 136 may be provided as a "hint" or guess as to what the driver 136 seeks, which may or may not be considered by the resource manager 112, for example, by using the requested number and/or type of executors as one factor in its decision-making process. Moreover, in some embodiments the driver 136 may be relieved of the burden of making these determinations, and thus the resource query 164 could be non-specific and allow the resource manager 112 to more intelligently perform the decision-making on behalf of the user, e.g., based on its knowledge of historical performance information.

In some scenarios, such as when a driver 136 provides a very specific request for resources as part of the resource query 164, the resource manager 112 may be able to use these specifics and learn from this usage. For example, upon determining that a particular job was in fact successfully executed with a particular resource configuration that was explicitly requested by the driver 136, the resource manager 112 may use this information as further training data for one or more ML models 132 used for resource selection. Similarly, if the resource manager 112 recommends a set of resources (e.g., a number/type of executors) and it can determine—via a clear signal from the driver 136, such as an explicit request for more or different executors—that it was incorrect (and/or correct), it can likewise use this information as part of further improving its logic, e.g., via a reinforcement learning type configuration.

As another example use case, it could be the case that the initial executor 150A, in performing a task 202, is spending a substantially large amount of time performing garbage collection. In such a case, the scheduler 138 may be able to detect this scenario, ask the resource manager 112 to deploy a larger executor 150B (e.g., with more CPU and/or other computing resource types), and then fail the task 202 on the initial executor 150A and start over on the "larger" executor 150B.

Alternatively, or additionally, in some embodiments the resource manager 112 (on its own detection, or based on a request from the driver 136) may determine that an executor requires more (or less) of a particular computing resource type and cause the executor—while it may be executing a task—to have access to more or less of the computing resource.

For example, in some embodiments, the resource manager 112 may determine that an executor may benefit from having additional processing capabilities and cause that executor to have extra processing capability. For example, in some embodiments, an executor 150 may be granted a particular number of CPU cores for usage (e.g., sixteen cores) but the underlying virtualization layer may be modified to expose those cores but with less than all of a "full" core—e.g., the virtualization layer may let the executor only truly utilize four of the cores. Upon determining that the executor would benefit from additional processing ability, the resource manager 112 may cause the virtualization layer to change the number of cores actually used for the executor, e.g., by allowing the executor to utilize eight cores, or perhaps even all sixteen of the cores. As a result, the executor may have always seen a constant number of cores available to it (e.g., sixteen), but after the scaling these sixteen cores are suddenly twice as performant, four times as performant, etc. Similarly, the performance may similarly be degraded when the executor does not require as much processing capability be changing how the underlying virtualization layer actually services the executor.

Other computing resources may also be scaled up or down for an executor, again possibly while executing a task. For example, the amount of volatile memory (e.g., RAM) may be adjusted by configuring the virtualization layer to implement the memory available to an executor differently. As one example, the executor may be assigned a particular amount of memory (e.g., 32 GB of RAM) but the virtualization layer may implement this using various memory types (e.g., 16 GB of RAM and 16 GB of swap space from a different type of memory/storage, such as a disk or SSD). If the resource manager 112 determines to add additional memory, it can cause the virtualization layer to change this ratio—e.g., 75% actual RAM and 25% swap, or 90% RAM and 10% swap, or even 100% RAM and no swap. The reverse is also true, such that more and more swap may be given to support executors that do not require substantial amounts of memory. Similar techniques may be implemented for non-volatile storage, e.g., by actually providing some "promised" storage from a preferred storage location (e.g., an SSD of the same host device) and some from a different storage location, such as a different type of disk or even a remote storage location.

Figure 3:
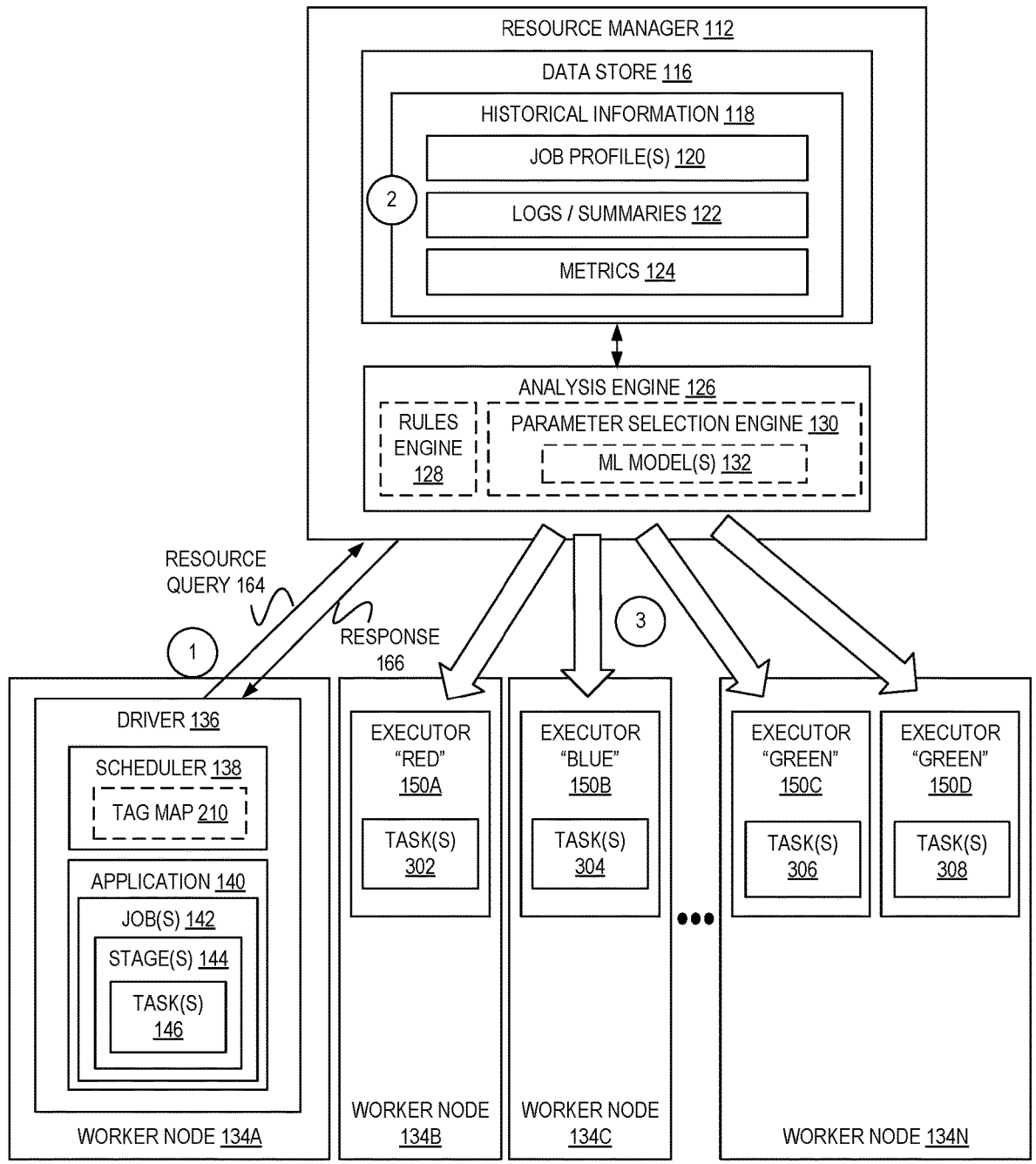
FIG. 3 is a diagram illustrating an environment with a self-tuning analytics system selecting proper execution resources based on historic job profile data according to some embodiments.

FIG. 3 is a diagram illustrating an environment with a self-tuning analytics system selecting proper execution resources based on historic job profile data according to some embodiments. In FIG. 3, a driver 136 may submit at circle (1) a resource query 164 seeking resources for a particular job 142 or task. The resource query 164 may include job-related information describing the job, its one or more stages, each stage's one or more tasks, characteristics of the involved dataset, etc. With this information, the analysis engine 126 may generate a job profile (e.g., a data structure characterizing the job across one or multiple dimensions) and compare it to previously seen job profiles 120 at circle (2). Upon finding a matching job profile or a similar job profile that executed in a satisfactory manner, the analysis engine 126 may determine to use the same (or similar) set of executor types for the execution of the current job 142 as used for the previous job.

As shown in FIG. 3, the resource manager 112 may configure multiple different types of executors at circle (3)—here, a red executor 150A, a blue executor 150B, and multiple green executors 150C-150D, where each color of executor represents a "type" of executor having a combination of computing resources that differs from that of other colors of executor. A red executor 150A may provide a comparatively large amount of CPU availability and capability, whereas blue executor 150B may provide a comparatively large amount of memory availability, and the green executors 150C-150D may provide a moderate amount of multiple different resources. In some embodiments, as described herein, the resource manager 112 may "tag" these executors with a tag/label and make this information available to the scheduler 138 (e.g., in a response 166, or a response to another query) for the scheduler to determine which executors are most well-suited for performing particular tasks.

Figure 4:
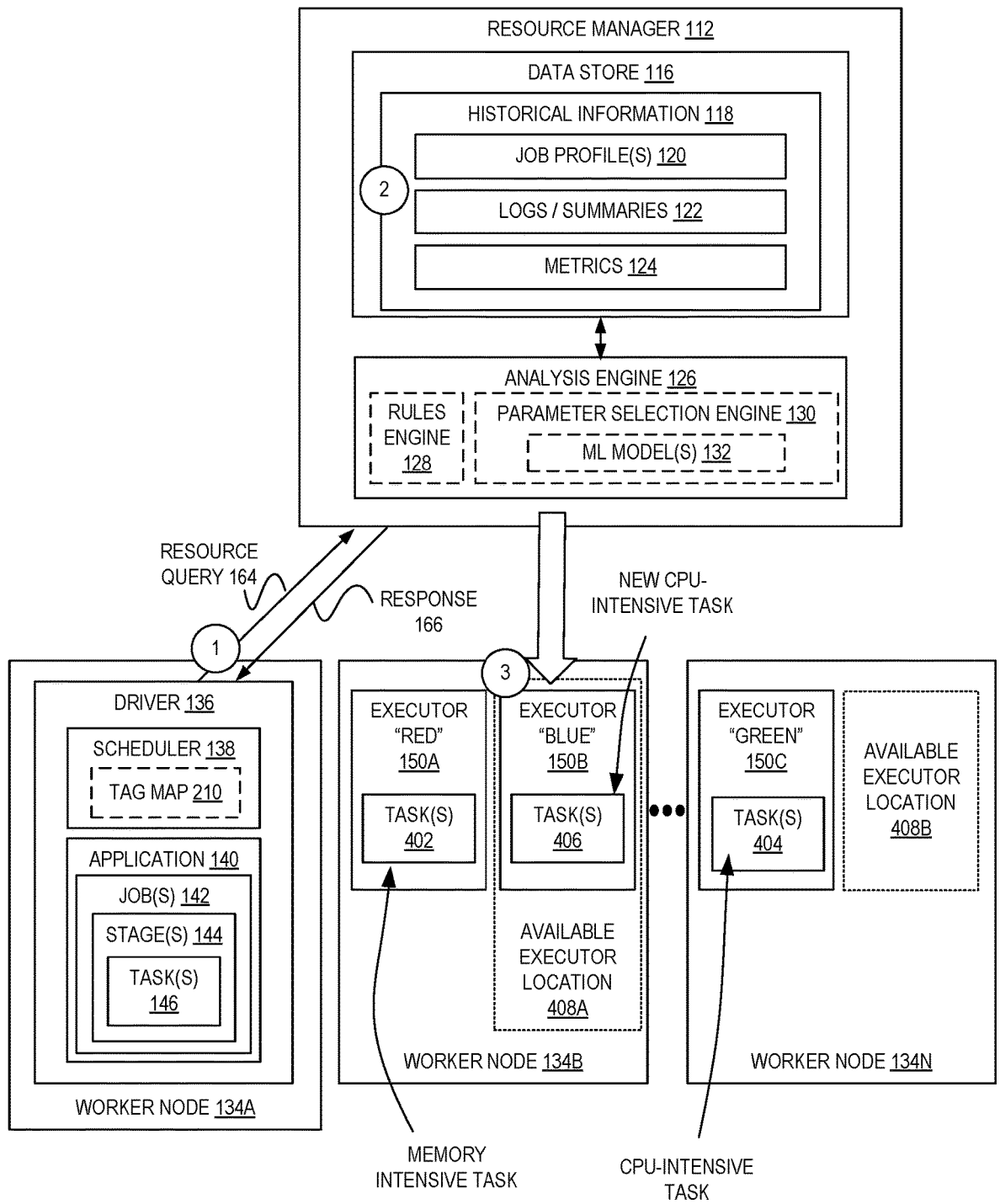
FIG. 4 is a diagram illustrating an environment with a self-tuning analytics system providing intelligent executor placement according to some embodiments.

Embodiments can also intelligently selection locations for executors. FIG. 4 is a diagram illustrating an environment with a self-tuning analytics system providing intelligent executor placement according to some embodiments. In some embodiments, the resource manager 112 may select particular locations for an executor to be launched based on characteristics of the job/task as well as characteristics of the current execution environment, i.e., aspects of the worker nodes, in-use executors, etc.

For example, at circle (1) a driver 136 issues a resource query 164 seeking executor resources for a particular task 460 that will be relatively processor intensive. The resource query 164 may indicate, for example, that a single executor is requested, that the executor needs to have a comparatively large amount of processing ability or specify a specific amount of processing cores, etc. The resource query 164 may also provide characteristics of the task 406 to be run, e.g., a description of the types of operations/transforms to be performed by the task, a description of the involved data, etc.

The analysis engine 126 may use the driver-specified information (pertaining to the need for comparatively large amounts of processing resources) and/or generate or consult a job profile (or task profile) and use a rules engine 128 and/or parameter selection engine 130 with this data to identify a type of executor to be launched (e.g., a "blue" executor 150B that here reflects an executor with a large amount of processor cores available) and identify an available executor location 408A/408B to place this executor.

In some embodiments, the analysis engine 126 utilizes logic to initially generate a set of candidate executor locations 408A/408B that can provide sufficient amounts of computing resources across multiple dimensions for the needed executor type. For example, if the needed type of executor requires four processor cores, the analysis engine 126 may eliminate from consideration available placement locations that only have one or two processor cores; similarly, if the needed type of executor also requires at least four gigabytes of memory, the analysis engine 126 may eliminate available executor locations from consideration that do have a sufficient amount of processor cores but that do not have at least four gigabytes of memory. In this example, we assume that two available executor locations 408A/408B are identified that include at least a minimum amount of computing resources for each of one or more dimensions of computing resource needed for the executor (e.g., processing capability, memory availability, storage availability, network ability, or the like).

The analysis engine 126 may then select an executor location based on characteristics of the involved worker nodes 134 and/or other executors and/or tasks executing at these worker nodes 134. For example, the analysis engine 126 may determine that a task 402 executed by another executor 150A on the worker node 134B is a "memory intensive" task (as it is currently or previously using a comparatively large amount of memory, performing a comparatively large amount of memory operations, etc.) or that the executor 150A itself is configured with a comparatively large amount of memory and/or a comparatively small amount of processing capability. In contrast, the analysis engine 126 may determine that a task 404 executed by a green executor 150C on another worker node 134N (having one of the candidate executor locations 408B) is a processing-intensive task (here, illustrated as "CPU-intensive") due to observed executor and/or infrastructural metrics received pertaining to that worker node 134N and/or executor 150C, and/or due to knowledge of the particular type of task 404 being performed (e.g., determining the task 404 includes operations designated as being processing intensive, or being similar to previous tasks that required a comparatively large amount of processing capability).

With this information, the analysis engine 126 may identify the available executor location 408A as being preferred for the new processing-intensive task 406, and thus can result in the "packing" of this processing-intensive task 406 next to a memory-intensive task 402, allowing for the worker node 134B to be highly utilized without negatively impacting the performance of either of the individual tasks. On a larger scale, then, the location placement (with performance consideration) selection scheme can improve the processing for particular jobs as well as across jobs (or even users), resulting in higher performance, higher utilization, less "wasted" resources, and fewer problems due to resource contention across the service.

As described herein, in some embodiments the driver 136 may flexibly provide different amount of specific details in a resource query 164 seeking executor resources. For example, when the driver 136 has a specific need, the driver 136 may provide specific information describing its need in the resource query 164, and when the driver 136 does not have a specific need or cannot determine exactly what it needs, the driver 136 may broadly request some amount of resources, allowing the resource manager 112 to "fill in the blanks" and intelligently select particular resource characteristics based on the current execution of the job and/or historic execution of other jobs.

Figure 5:
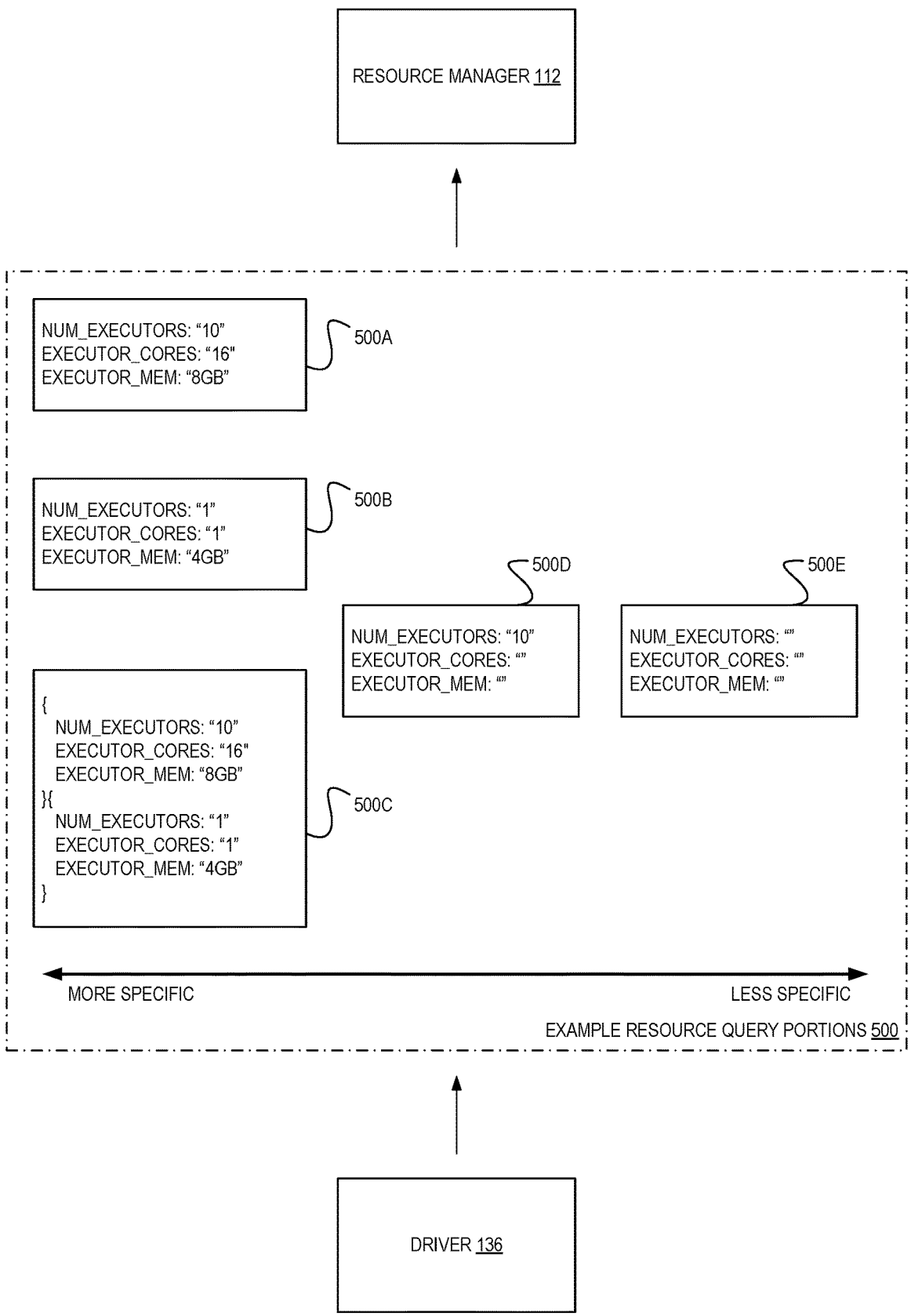
FIG. 5 is a diagram illustrating a self-tuning analytics system with flexible resource requesting according to some embodiments.

For example, FIG. 5 is a diagram illustrating a self-tuning analytics system with flexible resource requesting according to some embodiments. In FIG. 5, several exemplary attribute values are shown that can be used to allow the driver 136 to specify its resource need. These resource query portion examples 500A-500E include three types of attributes that can be specified; in various embodiments, the same or different attributes can be supported, more or fewer attributes can be supported, or the like.

On one end of the spectrum, the driver 136 may be very specific as shown in resource query portion examples 500A-500C. In example 500A, the driver 136 indicates that ten executors are sought, each having sixteen processor cores and eight gigabytes of memory. In example 500B, the driver 136 indicates that one executor is sought, having one processor core and four gigabytes of memory. Example 500C requests a heterogeneous set of executors—ten executors having sixteen processor cores and eight gigabytes of memory each, and one executor having one processor core and four gigabytes of memory.

The driver 136 may also be less specific, as shown in resource query portion example 500D, where ten executors are sought, though without providing specific requirements (or preferences) pertaining to the number of cores or memory, or as shown in resource query portion example 500E, where none of these attributes are specified. In these examples 500D-500E, the resource manager 112 may use techniques disclosed herein (e.g., based on profile characteristics of the job/stage/task at hand, based on historic profiles, based on execution characteristics from an event log stream, infrastructural metrics, and/or executor metrics, etc.) to determine the missing attribute values, e.g., how many cores or how much memory for the executors with regard to example 500D, how many executors and the types of these executors with regard to example 500E.

Figure 6:
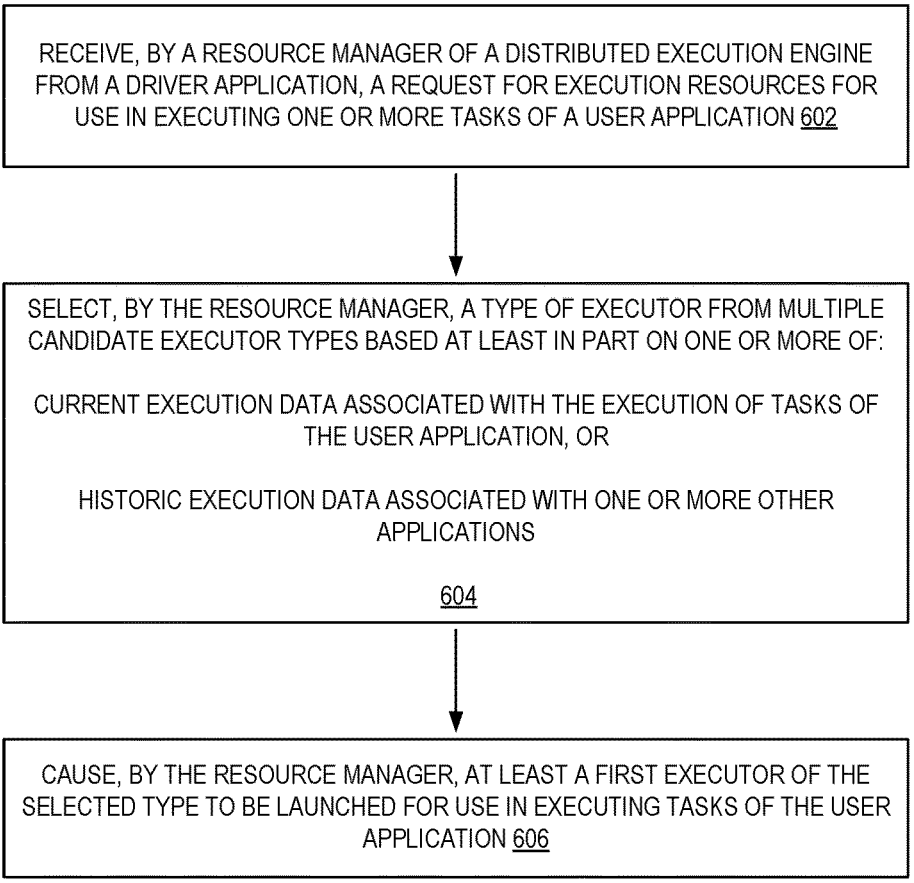
FIG. 6 is a flow diagram illustrating operations of a method for self-tuning analytics with observed execution optimization according to some embodiments.

FIG. 6 is a flow diagram illustrating operations 600 of a method for self-tuning analytics with observed execution optimization according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by analytics service 106 (e.g., the resource manager 112, and/or driver 136, etc.) of the other figures.

The operations 600 include, at block 602, receiving, by a resource manager of a distributed execution engine from a driver application, a request for execution resources for use in executing one or more tasks of a user application. At block 604, the operations 600 further include selecting, by the resource manager, a type of executor from multiple candidate executor types based at least in part on one or more of: current execution data associated with the execution of tasks of the user application, or historic execution data associated with one or more other applications.

In some embodiments, the current execution data associated with the execution of tasks of the user application comprises one or more of: event log data originated by the driver application based on the execution of the user application, or metric data describing characteristics of one or more worker nodes involved with executing the user application or characteristics of one or more other executors implemented by the one or more worker nodes in executing the user application.

In some embodiments, block 604 comprises: determining that a recent task of a job of the user application, as executed by a second executor, failed due to an insufficient amount of a computing resource, wherein the selected type of executor has a greater amount of that computing resource than a type of the second executor, wherein the computing resource is one of an amount of volatile memory, non-volatile storage, bandwidth, or processor cores.

In some embodiments, block 604 includes determining a first profile associated with the user application; determining that the first profile has a threshold amount of similarity with a second profile associated with a second user application of the one or more other applications; and selecting, as the type of executor, a same type of executor as used for the second user application.

The operations 600 further include, at block 606, causing, by the resource manager, at least a first executor of the selected type to be launched for use in executing tasks of the user application.

In some embodiments, the request includes a tag to be associated with the execution resources; and the causing at least the first executor to be launched comprises configuring the first executor with the tag to cause the first executor to provide the tag to the driver application.

In some embodiments, the operations 600 further include selecting, by the resource manager, a second type of executor from the multiple candidate executor types; causing, by the resource manager, at least a second executor of the second type to be launched for use in executing tasks of the user application, wherein the first executor and the second executor have at least one different amount of at least one computing resource.

In some embodiments, the operations 600 further include determining, by the driver application, that a first task of the user application being executed by a second executor satisfies a poor performance criterium; and sending, by the driver application, the request for execution resources, wherein the request is for the same first task.

In some embodiments, the operations 600 further include identifying a first worker node from multiple candidate worker nodes to host the first executor based on an analysis of at least a portion of the user application. In some embodiments, the analysis of the user application comprises: determining that the at least the portion of the user application satisfies a processing criterium, the processing criterium indicating that the at least the portion has a relatively high amount of processing need compared to other portions of the user application or compared to other portions of other applications. In some embodiments, the identifying the first worker node comprises determining that the first worker node hosts another executor running a memory-intensive portion of an application, wherein the application is the user application or another application.

In some embodiments, the operations 600 further include determining that first executor, while executing a task, has an insufficient amount of a computing resource; and reconfiguring the first executor, or a worker node that hosts the first executor, to have an additional amount of the computing resource.

Figure 7:
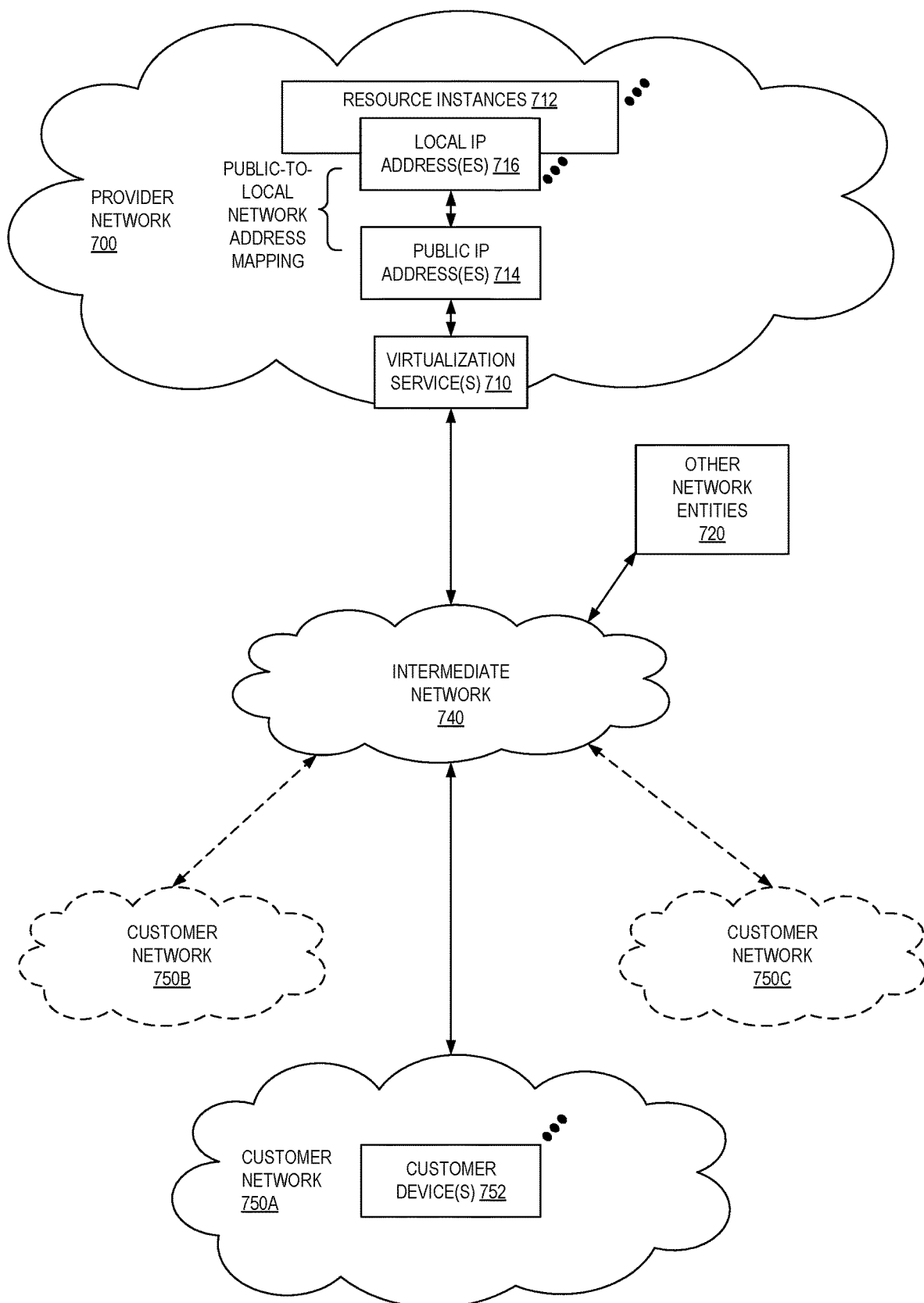
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
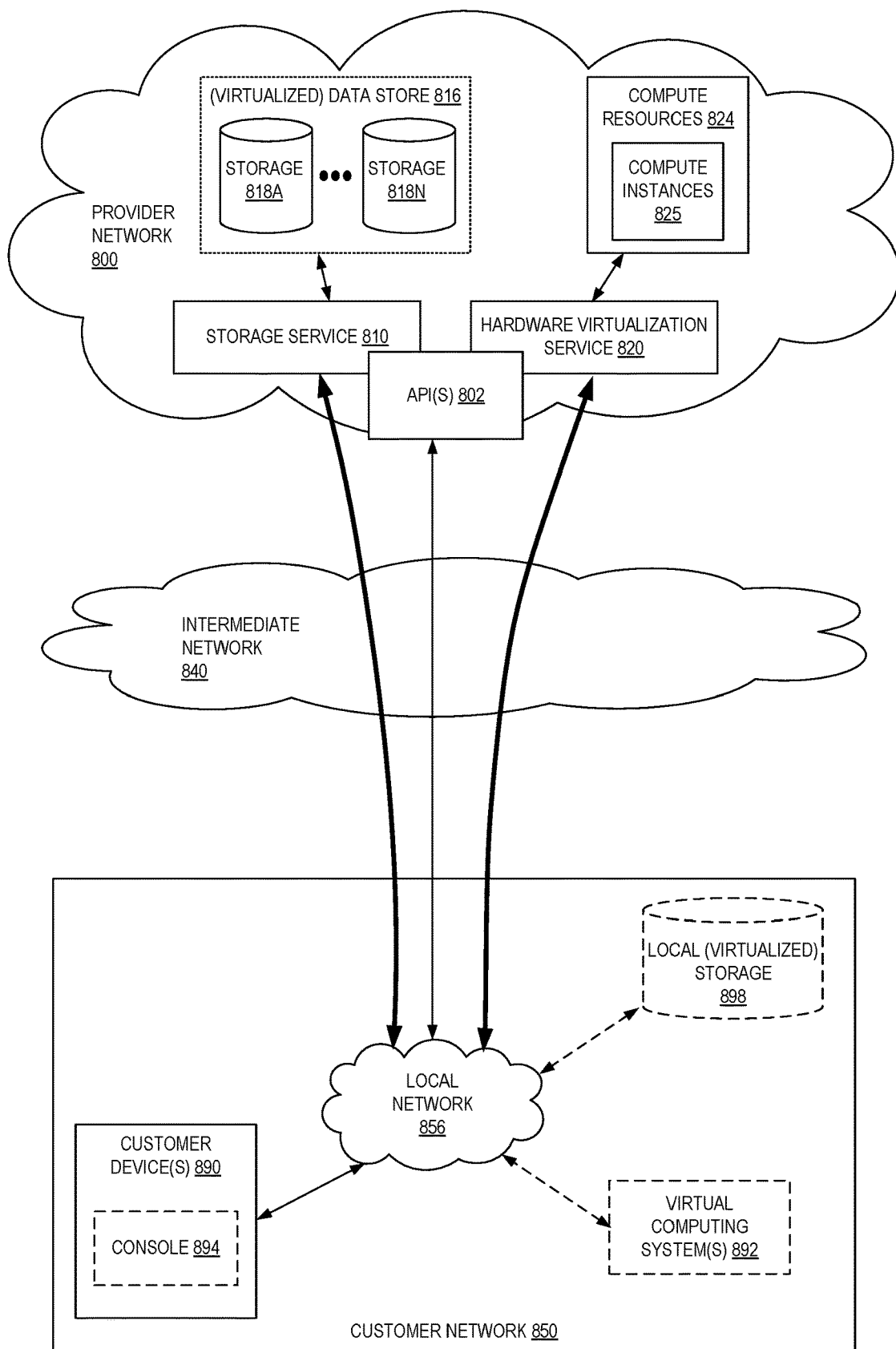
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
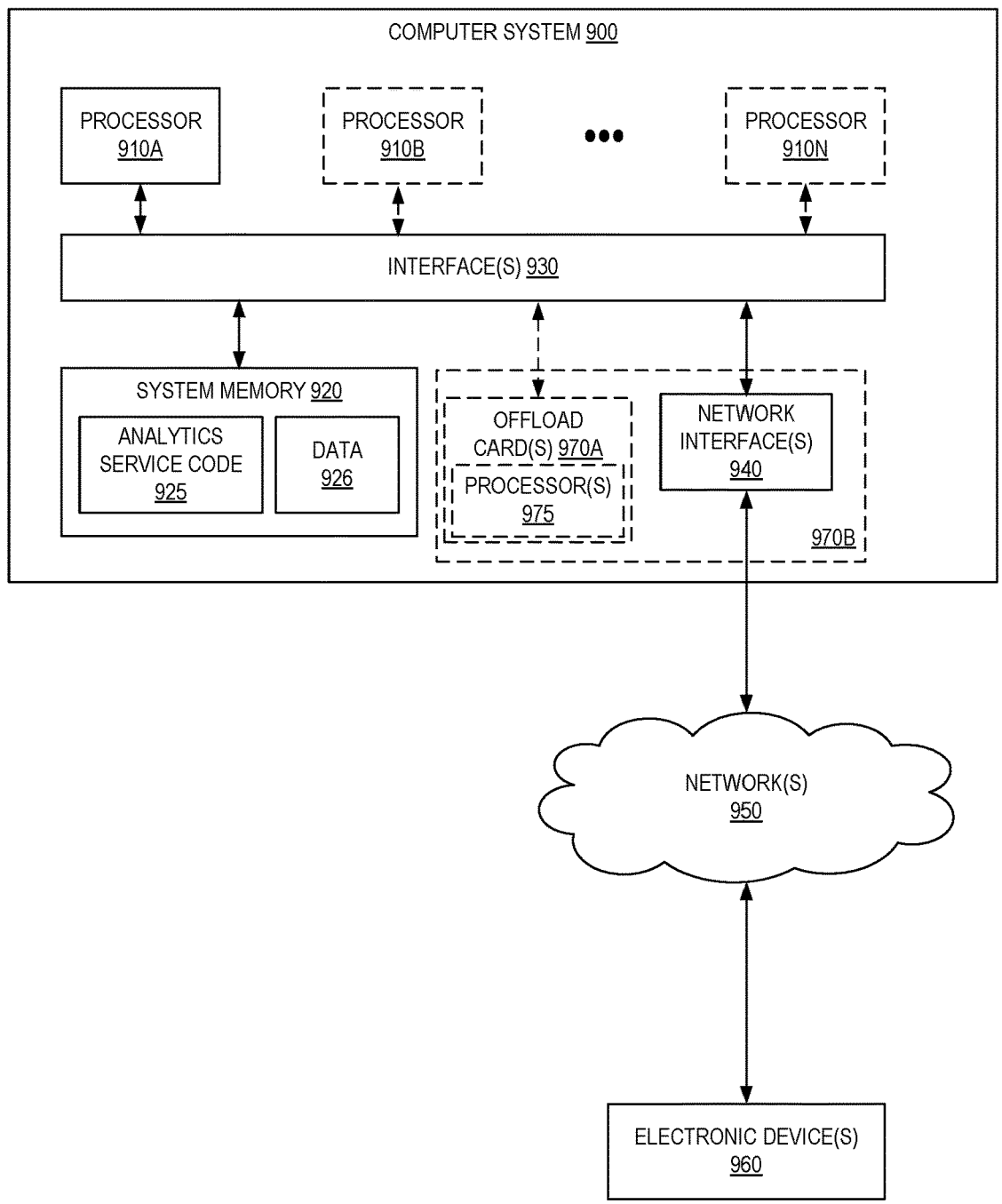
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as analytics service code 925 (e.g., executable to implement, in whole or in part, the analytics service 106) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a resource manager of a distributed execution engine from a driver application, a request for execution resources for use in executing one or more tasks of a user application, wherein the distributed execution engine is implemented in a multi-tenant service provider network;
   selecting, by the resource manager, a type of executor from multiple candidate executor types based at least in part on one or more of:
      event log data originated by the driver application based on the execution of the user application,
      metric data describing characteristics of one or more worker nodes involved with executing the user application or characteristics of one or more other executors implemented by the one or more worker nodes in executing the user application, or
      historic execution data associated with one or more other applications; wherein selecting, by the resource manager, the type of executor from multiple candidate executor types comprises:
         analyzing task execution history associated with the user application, or
         comparing a job or task profile of the user application to a job or task profile of another user application; and
   causing, by the resource manager, at least a first executor of the selected type to be launched for use in executing tasks of the user application.

2. The computer-implemented method of claim 1, wherein the selecting comprises:
   determining that a recent task of a job of the user application, as executed by a second executor, failed due to an insufficient amount of a computing resource,
   wherein the selected type of executor has a greater amount of that computing resource than a type of the second executor,
   wherein the computing resource is one of an amount of volatile memory, non-volatile storage, bandwidth, or processor cores.

3. The computer-implemented method of claim 1, wherein:
   the request includes a tag to be associated with the execution resources; and
   the causing at least the first executor to be launched comprises configuring the first executor with the tag to cause the first executor to provide the tag to the driver application.

4. A computer-implemented method comprising:
   receiving, by a resource manager of a distributed execution engine from a driver application, a request for execution resources for use in executing one or more tasks of a user application;
   selecting, by the resource manager, a type of executor from multiple candidate executor types based at least in part on one or more of:
      current execution data associated with the execution of tasks of the user application, or
      historic execution data associated with one or more other applications;
   wherein selecting, by the resource manager, the type of executor from multiple candidate executor types comprises:
      analyzing task execution history associated with the user application, or
      comparing a job or task profile of the user application to a job or task profile of another user application; and
   causing, by the resource manager, at least a first executor of the selected type to be launched for use in executing tasks of the user application.

5. The computer-implemented method of claim 4, wherein the current execution data associated with the execution of tasks of the user application comprises one or more of:
   event log data originated by the driver application based on the execution of the user application; or
   metric data describing characteristics of one or more worker nodes involved with executing the user application or characteristics of one or more other executors implemented by the one or more worker nodes in executing the user application.

6. The computer-implemented method of claim 4, wherein the selecting comprises:
   determining that a recent task of a job of the user application, as executed by a second executor, failed due to an insufficient amount of a computing resource,
   wherein the selected type of executor has a greater amount of that computing resource than a type of the second executor,
   wherein the computing resource is one of an amount of volatile memory, non-volatile storage, bandwidth, or processor cores.

7. The computer-implemented method of claim 4, wherein:
the request includes a tag to be associated with the execution resources; and
the causing at least the first executor to be launched comprises configuring the first executor with the tag to cause the first executor to provide the tag to the driver application.

8. The computer-implemented method of claim 4, further comprising:
selecting, by the resource manager, a second type of executor from the multiple candidate executor types; and
causing, by the resource manager, at least a second executor of the second type to be launched for use in executing tasks of the user application,
wherein the first executor and the second executor have at least one different amount of at least one computing resource.

9. The computer-implemented method of claim 4, wherein selecting, by the resource manager, the type of executor from multiple candidate executor types comprises:
determining a first profile associated with the user application;
determining that the first profile has a threshold amount of similarity with a second profile associated with a second user application of the one or more other applications; and
selecting, as the type of executor, a same type of executor as used for the second user application.

10. The computer-implemented method of claim 4, wherein the request for execution resources was transmitted, by the driver application, responsive to the driver application determining that a first task of the user application being executed by a second executor satisfies a poor-performance criterion.

11. The computer-implemented method of claim 4, further comprising:
identifying a first worker node from multiple candidate worker nodes to host the first executor based on an analysis of at least a portion of the user application.

12. The computer-implemented method of claim 11, wherein the analysis of the user application comprises:
determining that the at least the portion of the user application satisfies a processing criterion, the processing criterion indicating that the at least the portion has a relatively high amount of processing need compared to other portions of the user application or compared to other portions of other applications.

13. The computer-implemented method of claim 12, wherein the identifying the first worker node comprises determining that the first worker node hosts another executor running a memory-intensive portion of an application, wherein the application is the user application or another application.

14. The computer-implemented method of claim 4, further comprising:
determining that the first executor, while executing a task, has an insufficient amount of a computing resource; and
reconfiguring the first executor, or a worker node that hosts the first executor, to have an additional amount of the computing resource while the first executor continues executing the task,
wherein the computing resource comprises one or more of a number of central processing unit (CPU) cores, an amount of volatile memory, or an amount of non-volatile storage.

15. A system comprising:
a first one or more electronic devices to implement a data plane of an analytics service in a multi-tenant provider network, the data plane to host worker nodes to run executors for executing distributed user applications; and
a second one or more electronic devices to implement a control plane of the analytics service in the multi-tenant provider network, the control plane including instructions that upon execution cause the control plane to:
receive, from a driver application associated with a user application, a request for execution resources for use in executing one or more tasks of the user application;
select a type of executor from multiple candidate executor types based at least in part on one or more of:
current execution data associated with the execution of tasks of the user application, or
historic execution data associated with one or more other applications executed by the data plane;
wherein the instructions that upon execution cause the control plane to select the type of executor from multiple candidate executor types comprise instructions that upon execution cause the control plane to:
analyze task execution history associated with the user application, or
compare a job or task profile of the user application to a job or task profile of another user application; and
cause at least a first executor of the selected type to be launched for use in executing tasks of the user application.

16. The system of claim 15, wherein the current execution data associated with the execution of tasks of the user application comprises one or more of:
event log data originated by the driver application based on the execution of the user application, or
metric data describing characteristics of one or more worker nodes, provided by the data plane, involved with executing the user application or characteristics of one or more other executors implemented by the one or more worker nodes in executing the user application.

17. The system of claim 15, wherein to select the type of executor, the control plane is to:
determine that a recent task of a job of the user application, as executed by a second executor, failed due to an insufficient amount of a computing resource,
wherein the selected type of executor has a greater amount of that computing resource than a type of the second executor,
wherein the computing resource is one of an amount of volatile memory, non-volatile storage, bandwidth, or processor cores.

18. The system of claim 15, wherein:
the request includes a tag to be associated with the execution resources; and
the causing at least the first executor to be launched comprises configuring the first executor with the tag to cause the first executor to provide the tag to the driver application.

19. The system of claim 15, wherein the instructions upon execution further cause the control plane to:
determine that the first executor, while executing a task, has an insufficient amount of a computing resource; and reconfigure the first executor, or a worker node that hosts the first executor, to have an additional amount of the computing resource while the first executor continues executing the task, wherein the computing resource comprises one or more of a number of central processing unit (CPU) cores, an amount of volatile memory, or an amount of non-volatile storage.

20. The system of claim 15, wherein the instructions upon execution further cause the control plane to:
  determine a first profile associated with the user application; and
  determine that the first profile has a threshold amount of similarity with a second profile associated with a second user application of the one or more other applications,
  wherein the selection of the type of executor includes a selection of a same type of executor used for the second user application.

\* \* \* \* \*